United States Patent [19]
Harder et al.

[11] Patent Number: 5,193,398
[45] Date of Patent: Mar. 16, 1993

[54] MEASURING METHOD FOR DETERMINING THE ELONGATION AFTER RUPTURE OF A TENSILE TESTPIECE

[75] Inventors: Jürgen Harder, Neukirchen/Vlluyn; Günter Robiller, deceased, late of Mülheim-Ruhr, both of Fed. Rep. of Germany, by Elisabeth Robiller, heiress; Hans-Martin Sonne, Dinslaken, Fed. Rep. of Germany

[73] Assignee: Thyssen Stahl Aktiengesellschaft, Duisburg, Fed. Rep. of Germany

[21] Appl. No.: 757,427

[22] Filed: Sep. 10, 1991

[30] Foreign Application Priority Data

Sep. 13, 1990 [DE] Fed. Rep. of Germany ....... 4029013

[51] Int. Cl.$^5$ ............................................. G01N 3/08
[52] U.S. Cl. .................................................. 73/834
[58] Field of Search .................... 73/830, 834; 33/1 L

[56] References Cited

U.S. PATENT DOCUMENTS

| | | | |
|---|---|---|---|
| 4,031,746 | 6/1977 | Furuta et al. | 73/834 X |
| 4,821,579 | 4/1989 | Gernhart et al. | 73/834 X |
| 4,895,029 | 1/1990 | Yamada et al. | 73/827 |

FOREIGN PATENT DOCUMENTS

| | | |
|---|---|---|
| 3401527 | 8/1985 | Fed. Rep. of Germany . |
| 3813340 | 11/1988 | Fed. Rep. of Germany . |
| 3901432 | 8/1990 | Fed. Rep. of Germany . |

OTHER PUBLICATIONS

German Industrial Standard (DIN) No. EN 10 002, Jun. 1987.
"Probleme des rechnergesteuerten Zugversuchs", Gunter Robbiler, Materialprufung 31 (1989), pp. 371–376.

*Primary Examiner*—Jerry W. Myracle
*Attorney, Agent, or Firm*—Sprung Horn Kramer & Woods

[57] ABSTRACT

The invention relates to a measuring method to determine elongation after fracture on a tensile testpiece in a computer controlled tensile test. To meet the requirements of the tensile test to DIN EN 10002/1, the measuring grid known from DIN EN 10002/1 is applied to the tensile testpiece. The measuring grid is scanned with a line sensing camera. In the tensile test the elongation of the testpiece is determined when the tensile force has exceeded its maximum and drops to zero. That place for which the computer with the CCD camera detects the greatest distance between adjacent grid lines is utilized to calculate the elongation after fracture to DIN EN 10002/1.

6 Claims, 4 Drawing Sheets

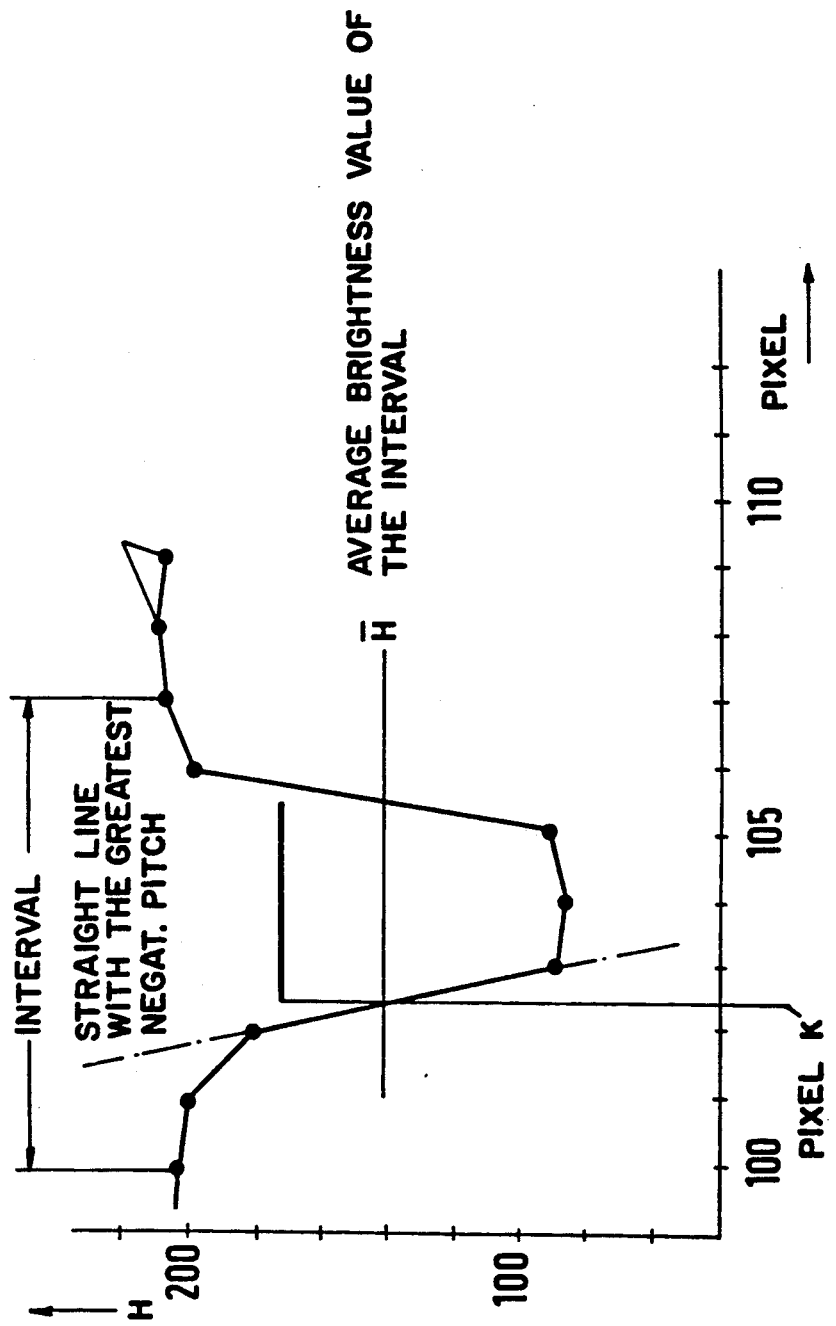

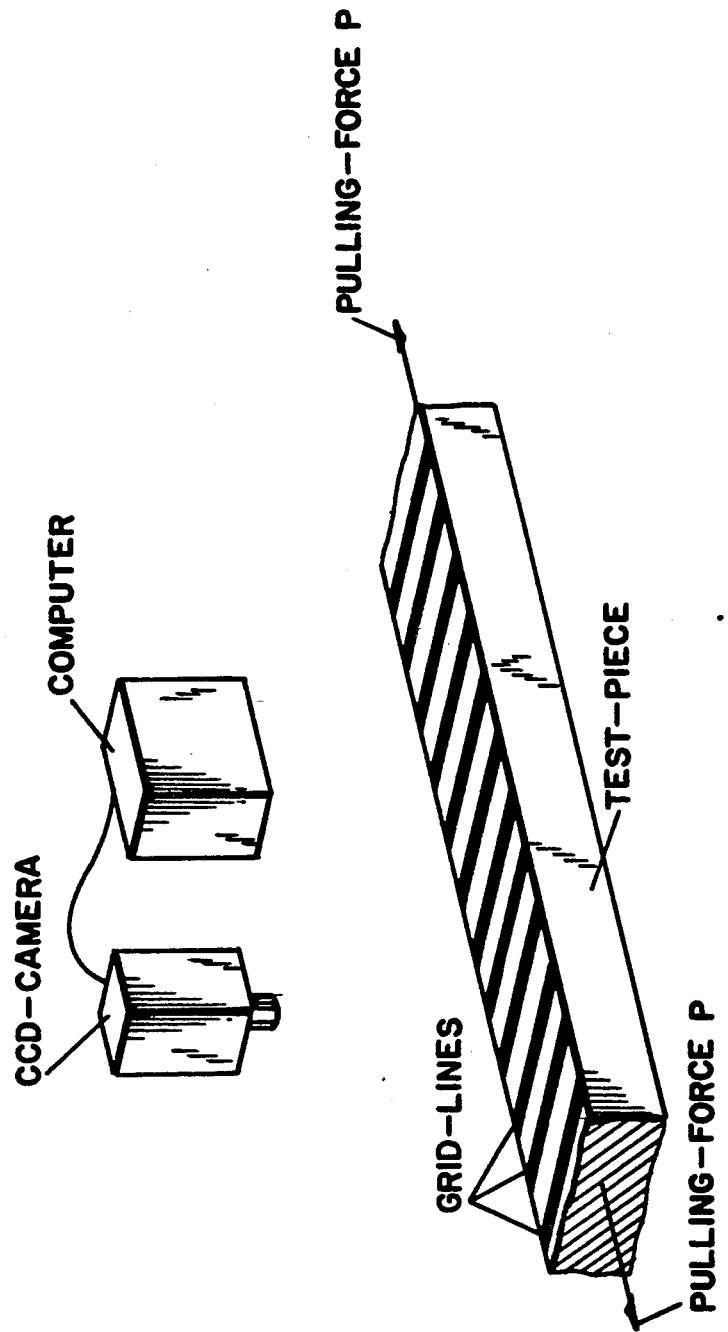

MEASURING METHOD FOR DETERMINING THE ELONGATION AFTER RUPTURE OF A TENSILE TESTPIECE

BACKGROUND OF THE INVENTION

At present elongation after rupture is determined in the computer controlled tensile test (to DIN EN 10002/1) using an extension sensor attached to the tensile testpiece by two measuring sensors. Preferably incremental, but also inductive extension sensors are used. The extension sensors measure the elongation of the testpiece between the two measuring sensors until the testpiece ruptures. The accuracy of the measuring result mainly depends on the position of the rupture in relation to the two measuring sensors. Elongation after rupture can be reliably measured in this manner only if rupture takes place in the center between the measuring sensors. In the case of highly ductile materials, even eccentric ruptures which still clearly lie between the measuring sensors result in lower values of elongation after rupture, since a proportion of the elongation with necking lies outside the sensors and is therefore not measured by the extension sensor.

The determination of the elongation after fracture is improved if the extension of the tensile testpiece decisive therefor is determined as the sum of elongation without necking and elongation with necking. The elongation with necking corresponds to the total elongation of the testpiece (main transverse path) after the maximum force has been exceeded. However, that method provides reliable values, independently of the position of the rupture in relation to the measuring sensors, only if the measuring length $L_o$ ($L_o$=initial measuring length (mm) of the tensile testpiece prior to the tensile test) is substantially equal to the testpiece test length $L_c$ (mm). With an increasing test length in relation to the measuring length (increasing $L_c/L_o$ ratio) increasingly higher and therefore incorrect values of elongation after fracture are obtained in the computer controlled tensile test. The reason for the incorrect values of elongation after fracture is that in that method the whole extension with necking is always measured. In contrast, clear values of elongation after rupture are obtained even in the case of eccentric ruptures and end ruptures when elongation after rupture is determined manually to DIN EN 10002/1 (Journal: Materialprüfung 31 (1989) 11-12, pp. 371-376).

For the measurement of the elongation of a tensile testpiece, but not its elongation after rupture, an apparatus is known in which there are disposed on the tensile testpiece two spaced-out lines which extend transversely of the pulling direction and which are scanned together with fixed comparison markings by one or two line sensing cameras. The elongation of the tensile testpiece can be determined from the measured values thus obtained (DE 38 13 340 A1). That apparatus is not suitable for determining the elongation after fracture of a tensile testpiece.

SUMMARY OF THE INVENTION

It is an object of the invention to provide a measuring method for the computer controlled tensile test which even in the case of eccentric testpiece ruptures provides reliable values of elongation after fracture using the rules of end fracture measurement set forth in DIN EN 10002/1. Moreover, the elongation after fracture obtained is independent of the $L_c/L_o$ ratio.

This problem is solved by a measuring method for determining the elongation after fracture of a more particularly metal testpiece in a computer controlled tensile test, wherein a measuring grid line, consisting of grid lines extending transversely of the pulling direction and applied to the tensile testpiece, is scanned by means of a line sensing camera (CCD camera) and for the different brightness values detected as a result, measured values are supplied to a computer which, when the tensile force has exceeded its maximum and drops to zero, calculates from the measured values that time the distance is between adjacent grid lines and selects therefrom the greatest distance between two adjacent grid lines as the place of the fracture and which utilizes the distance between the grid lines adjacent said place for the calculation to Standard of the elongation after rupture.

In contrast with the manual determination of elongation after fracture, according to the invention the elongation of the testpiece is measured not following, but at the instant of fracture. This has made it possible for the first time to determine precise values of elongation after fracture by the camera, since measurement following fracture requires the additional measurement of the resulting rupture gap, something which causes problems of optical measurement if the fracture extends through a grid line or if the fracture does not extend perpendicularly to the surface of the testpiece.

A comparison of the measuring results of the method according to the invention with the results of manual determination of elongation after fracture to DIN EN 10002/1 has shown that the measuring method according to the invention meets the demands of DIN EN 10002/1, more particularly in the case of the measurement of an end rupture, if the testpiece ruptures outside the central third of the measuring length.

According to the invention the measuring grid of proven value in the manual determination of elongation after fracture is used in a variant form, to achieve optimum imaging in the camera. A light-absorbing measuring grid is applied instead of the tracing lines, to preclude the effect of reflections. The individual measuring grid lines should be large enough to produce the maximum shadowing in the CCD camera. The total test length $L_c$ of the testpiece should also be provided with measuring grid lines, to enable the end rupture measurement to be performed to DIN EN 10002/1. The number of measuring grid lines is $L_c/5+1$ (5=measuring grid line distance in mm).

The course followed by the drop in tensile force to zero differs in different materials. It may therefore be convenient to determine by various criteria that instant whose measured values should be used for processing in the computer. In the case of tensile testpieces having shallowly dropping characteristics, those measured values should be used which are obtained when the tensile force has dropped to zero. In contrast, in the case of steeply dropping characteristics, use can be made of the values at the instant of the maximum speed of the drop in force.

To achieve high accuracy, a CCD camera should be used which allows a pixel-precision read-out and which has a high aperture. This demand is met if the width of a grid line is substantially greater than the distance between adjoining pixels.

To determine the edges of the grid lines on the testpiece prior to the tensile test, and to determine the required test length via the scanning of the grid lines, according to one feature of the invention from the connecting straight lines for the brightness values delivered for measuring places lying one beside the other, the connecting lines with the greatest positive and negative pitch are selected, and for the distance between said connecting straight lines, which is equal to the width of a grid line, the brightness value of said grid line is determined, from whose point of intersection with the connecting straight lines the position for the edges of the grid lines is determined. By forming the difference between the positions thus determined for the edges of the grid lines, which correspond to the test length of the tensile testpiece, the absolute test length of the tensile testpiece can be determined prior to the tensile test, having regard to the optical imaging scale.

If the width of a grid line is not known, as is the case due to elongation by the tensile test, the edge of a grid line can also be determined by another method. In the other method from the connecting straight lines for the brightness values delivered for the measuring places lying one beside the other, the straight lines with the greatest positive or negative pitch are selected, and on each of said connecting straight lines the place with the mean brightness value between the measuring places lying one beside the other is determined for the position of the front or rear edge of the associated grid line. The length of the testpiece after elongation can then be determined as in the first method.

The invention will now be explained in greater detail with reference to the drawings.

BRIEF DESCRIPTION OF THE DRAWINGS

FIG. 3 is a graph for determining the position of a measuring grid line by calculating the edge position by the average brightness, the width of the grid line being unknown.

FIG. 4 is a representative diagram of the scanning apparatus utilized with the present invention.

DESCRIPTION OF THE PREFERRED EMBODIMENTS

Figure 1:
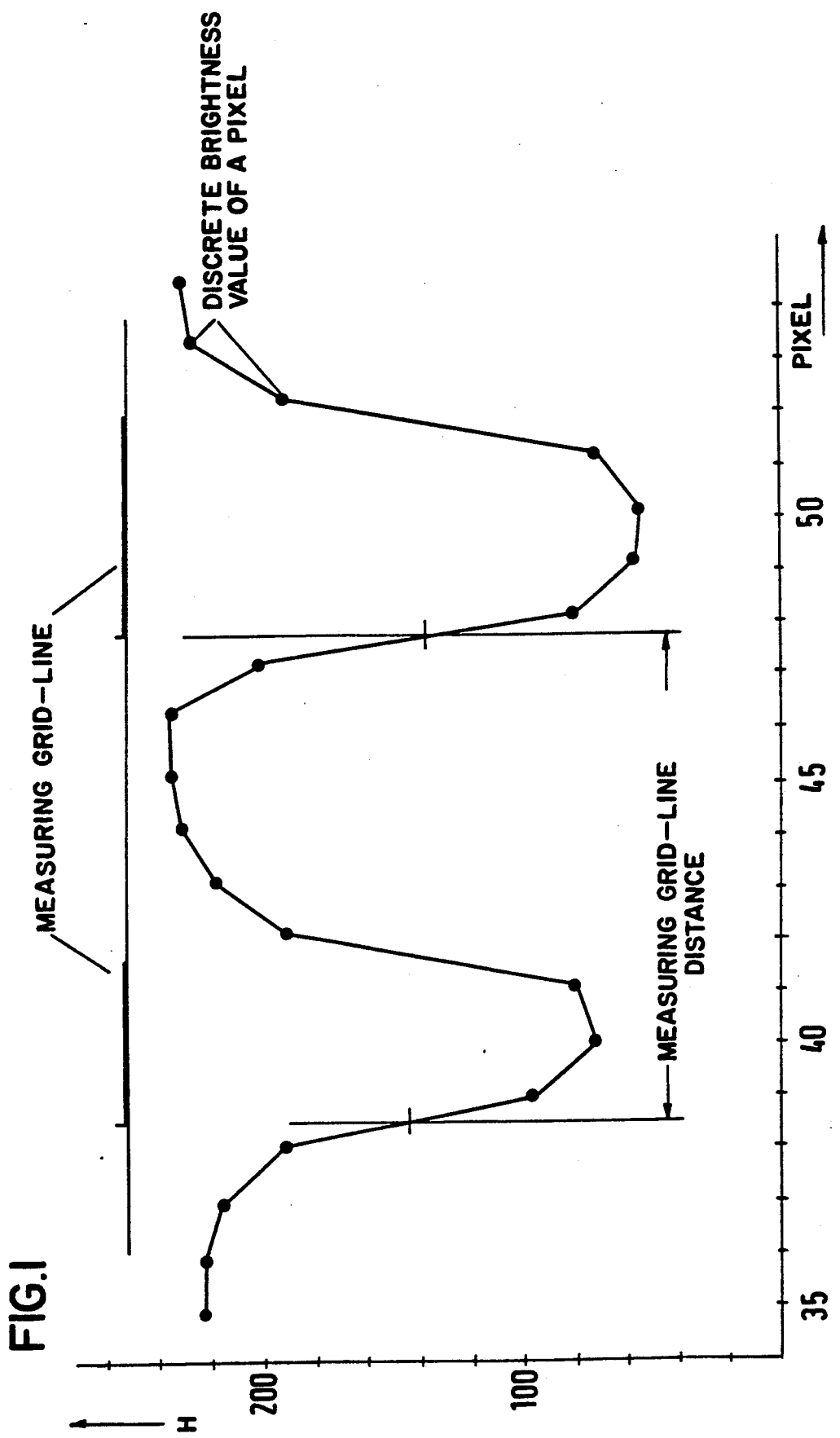
FIG. 1 is a graph of the course of brightness of a measuring grid line extending over two adjoining grid lines.

FIG. 1 shows a detail of the course of brightness over a measuring grid line of a testpiece. The course of brightness is detected by the CCD camera and transmitted to a computer. The graph shows how no sudden change in brightness takes place at the edges of the measuring grid lines, the increase and decrease in brightness taking place gradually. The maximum possible shadowing can be obtained by selecting the minimum width for the measuring grid lines. Even although the transition in brightness is gradual, the position of the edge of a measuring grid line can be determined accurately enough by a suitable interpolation procedure.

Figure 2:
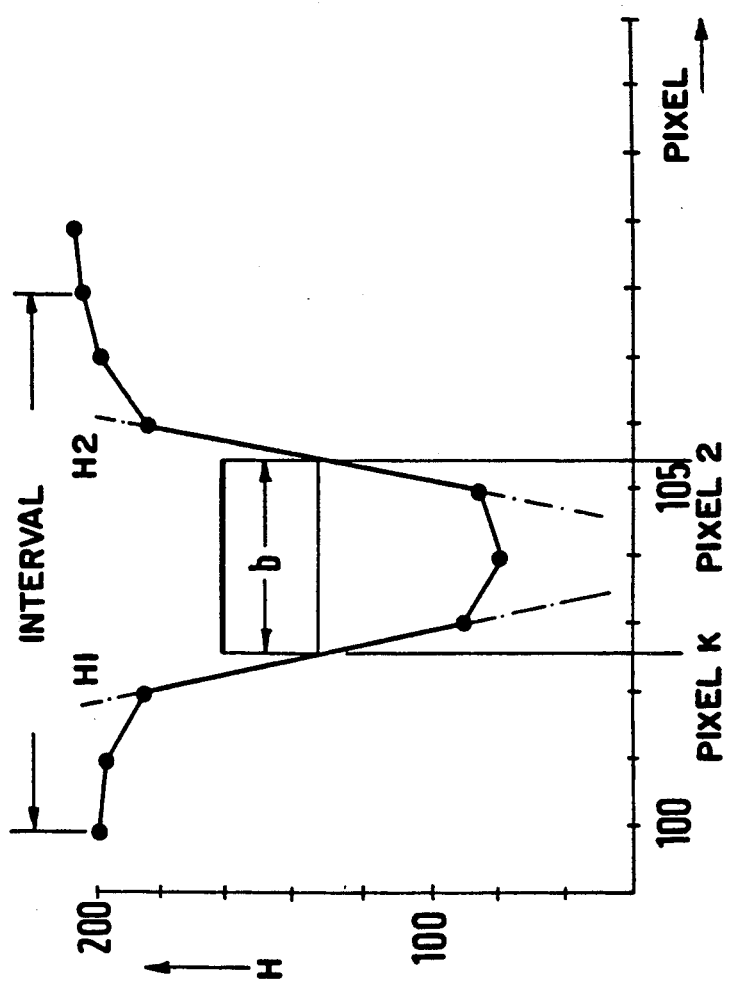
FIG. 2 is a graph for determining the position of a measuring grid line by calculating the edge position of a grid line with a known width of the grid line.

In the embodiment illustrated in FIG. 2 the position of the edge is determined starting from the fact that the width of the grid lines is constant and known. To determine the position of the front edge (pixel k) for the individual measuring grid lines disposed one above the other, the discreet brightness values measured by the CCD camera are connected by straight lines. Out of these straight lines, over the interval in which the measuring grid line was discovered, the straight line H1 with the maximum positive pitch and the straight line H2 with the maximum negative pitch are selected and the coefficients a0, a1; b0, b1 respectively are determined therefor. Then from the two straight line equations H1=a0+a1 . pixel, H2=b0+b1 . pixel that brightness value is calculated at which the two straight lines are at a distance of a measuring grid line width b from one another. This brightness value corresponds to the edge position of a measuring grid line. The pixel position pixel k of the front edge is obtained by inserting this brightness value in the straight line equation with the negative pitch. This calculation is as follows:

H1=a0+a1*pixel equation of the bright/dark transition

H2=b0+b1*pixel equation of the dark/bright transition

The brightness value Hk is required, for which the difference in the pixel values is pixel2−pixelk=b.

$$Hk = a0 + a1 * pixelk \rightarrow pixelk = (Hk - a0)/a1$$

$$Hk = b0 + b1 * pixel2 \rightarrow pixek2 = (Hk - b0)/b1$$

With a known measuring grid line width b we have:

$$pixel2 - pixelk = b = (Hk - b0)/b1 - (Hk - a0)/a1$$

$$Hk = (b* + a1*b1 + a1*b0 - a0*b1)/(a1 - b1)$$

The associated pixel position:

$$pixelk = (Hk - a0)/a1$$

When multiplied by the optical imaging scale, the differences in the pixel positions of all the edges give the required edge distances. By adding together these edge distances we obtain the test length $L_c$.

When the testpiece has been elongated, the measuring grid lines have different widths. The edge positions are determined (FIG. 3) by the Formula $$\bar{H} = a0 + a1 * pixelk$$

$$pixelk = (\bar{H} - a0)/a1$$

The front edge position (pixel k) of each measuring grid line is determined by selecting the straight line Hm with the maximum negative pitch over the interval in which the measuring grid line was discovered. The coefficients a0 and a1 are determined for the straight line Hm. The point at which the straight line Hm intersects the straight line H for the mean brightness of the interval is the required edge position.

To determine the elongation after fracture by the method according to the invention, the measuring grid lines are applied to the testpiece. Then the testpiece is clamped in the tensile testing machine and checked to make sure that the light conditions permit a measurement and that there are a sufficient number of measuring grid lines present for the test length $L_c$ used. Next, the distance between the measuring grid lines and the optical imaging scale, which varies with testpieces of different thickness, are determined by the methods illustrated in FIG. 2 or 3. Then the tensile test is started. When the maximum force has been exceeded, the force and the distances between the measuring grid lines are continuously measured and stored in the computer until the testpiece has ruptured. Out of the values thus obtained, use is made for evaluation of either the values recorded at the maximum speed of drop in force, or preferably the values when the tensile force reaches zero. The instant of maximum speed of drop in force can be determined in a problem-free manner by differentiation of the force/time curve.

Evaluation is carried out to DIN EN 10002/1, the place of rupture selected being that place on the testpiece at which the distance between two adjoining measuring grid lines is maximum. From that place the measuring length $L_u$ is then determined by endeavouring, starting from the place of rupture, to count off on both testpiece halves the number of measuring grid lines included in half the value of the measuring length $L_o$. If this succeeds, $L_u$ is determined directly by adding up in intervening distances. If it does not succeed, $L_u$ is determined by the procedure of end rupture measurement described in DIN EN 10002/1, by transferring the rupture to the center of the measuring length, $L_u$ being taken as the elongation after fracture in relation to the initial measuring length $L_o$.

The apparatus for scanning grid lines according to the method of the present invention is illustrated in FIG. 4. In this figure a line sensing CCD camera is shown which has a high aperture, permitting a pixel-precise read out.

There has thus been shown and described a novel measuring method for determining the elongation after rupture of a tensile testpiece in the computer controlled tensile test which fulfills all the objects and advantages sought therefor. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

We claim:

1. A measuring method for determining the elongation after fracture of a test piece in a tensile test, said method comprising the steps of scanning a measuring grid line, consisting of grid lines extending transversely of the pulling direction and applied to the tensile test piece, said scanning being effected by means of a line sensing camera; detecting the different brightness values as a result of such scanning; determining the measured values when the tensile force has exceeded its maximum and drops to zero; calculating from the measured values that time the distance is between adjacent grid lines and selecting therefrom the greatest distance between two adjacent grid lines as the place of the fracture and calculating the elongation after fracture utilizing the distance between the grid lines adjacent said place.

2. A measuring method according to claim 1, wherein for calculating the elongation after fracture use is made of the measured values at the time when the tensile force has dropped to zero.

3. A measuring method according to claim 1, wherein for calculating the elongation after fracture use is made of the measured values at the moment of maximum speed in the drop in tensile force.

4. A measuring method according to claim 1, wherein the line sensing camera has a high aperture which permits a pixel-precise read-out.

5. A measuring method according to claim 1, including selecting the connecting straight lines with the greatest positive and negative pitch for the brightness values delivered for measuring places lying one beside the other, and determining for the distance between said connecting straight lines (H1, H2), which is equal to the width (b) of a grid line, the brightness value (Kk) of the grid line from whose point of intersection with the connecting straight lines (H1, H2) the position for the edges (pixel k, pixel 2) of the grid lines is determined.

6. A measuring method according to claim 1, including selecting the connecting straight lines with the greatest positive or negative pitch for the brightness values delivered for the measuring places lying one beside the other, and determining on each of said connecting straight lines the place with the mean brightness value (H) between the measuring places lying one beside the other for the position of the front or rear edge of the associated grid line.

* * * * *